United States Patent
Shrim et al.

(10) Patent No.: US 6,265,102 B1
(45) Date of Patent: Jul. 24, 2001

(54) PRISMATIC METAL-AIR CELLS

(75) Inventors: Yaron Shrim; Mariano Abramson, both of Jerusalem (IL); Robert B. Dopp, Marietta, GA (US)

(73) Assignee: Electric Fuel Limited (E.F.L.), Jerusalem (IL)

( * ) Notice: Subject to any disclaimer, the term of this patent is extended or adjusted under 35 U.S.C. 154(b) by 0 days.

(21) Appl. No.: 09/187,567

(22) Filed: Nov. 5, 1998

(51) Int. Cl.⁷ .................................................. H01M 2/02
(52) U.S. Cl. ......................... 429/172; 429/163; 429/176
(58) Field of Search .................................. 429/229, 163, 429/175, 176, 162, 185, 173

(56) References Cited

U.S. PATENT DOCUMENTS

| D. 426,515 | * | 6/2000 | Buckle | D13/103 |
|---|---|---|---|---|
| 4,118,544 | * | 10/1978 | Przybyla et al. | 429/27 |
| 5,306,578 | * | 4/1994 | Ohashi et al. | 429/27 |
| 5,306,580 | * | 4/1994 | Mansfield et al. | 429/175 |
| 5,576,117 | * | 11/1996 | Morita et al. | 429/162 |
| 6,060,196 | * | 5/2000 | Gordon et al. | 429/229 |

* cited by examiner

*Primary Examiner*—Gabrielle Brouillette
*Assistant Examiner*—M. Wills
(74) *Attorney, Agent, or Firm*—Helfgott & Karas, P.C.

(57) ABSTRACT

The invention provides a metal-air electrochemical cell, having a leak-proof, metal prismatic casing comprising a pair of interfacing interengaging rectangular tray-like casing components, a first substantially rectangular tray-like casing component having a first major surface and contiguous side walls for encompassing a cathode of the cell and a second inverted substantially tray-like casing component having a second major surface and contiguous depending side walls for encompassing an anode of the cell, the side walls of one of the casing components being of a height to facilitate the curling and crimping of an upper portion thereof over a peripheral edge area of the major surface of the other casing component to form a leak-proof, closed prismatic casing.

21 Claims, 3 Drawing Sheets

PRISMATIC METAL-AIR CELLS

The present invention relates to prismatic metal-air, primarily zinc-air, electrochemical cells.

Currently, the major commercial application for zinc-air cells is in hearing aids, whereby the cell shape is button-like. These cells are usually manufactured from metal and closed by crimping. This method of sealing is successful and electrolyte, usually KOH, leakage does not occur. The success of this method is due to the circular shape of the cell which ensures a uniform distribution of forces around the cell's circumference and along its joint(s).

As is known and as described, e.g., in U.S. Pat. No. 5,733,676, metal-air cells convert atmospheric oxygen to hydroxyl ions in the air cathode. The hydroxyl ions then migrate to the anode, where they cause the metal contained in the anode to oxidize. Usually the active anode material in such cells comprises zinc.

More particularly, the desired reaction in a metal-air cell air cathode involves the reduction of oxygen, the consumption of electrons, and the production of hydroxyl ions. The hydroxyl ions migrate through the electrolyte to the anode, where oxidation of zinc occurs, forming zinc oxide, and liberating electrons.

Electrolyte leaks in zinc-air cells are the result of several factors. First, the zinc anode expands when oxidized to zinc oxide during the course of discharge. Because of the lower density of the oxide, volume increases ranging from 17 to 60% have been reported. When a cell's anode compartment expands, the walls of the cell casing distort causing electrolyte leakage at the joints.

Hydrogen gas, when not permitted to vent at a reasonable rate, is also a source of internal cell pressure. Hydrogen is produced by the parasitic reaction of zinc with the cell's alkaline electrolyte and occurs even when the cell is dormant. Galvanic reactions between contaminant metals, such as nickel, iron and chromium and the electrolyte are another source of hydrogen gas generation.

Another factor in electrolyte leakage is the phenomenon of KOH "creep". It is well documented that KOH flows easily over many types of surfaces, especially metal surfaces. It is difficult to control this flow which occurs even in a contra-gravitational direction.

Many different solutions to these expansion/leakage problems have been suggested for zinc-air button cells. As mentioned previously, crimping is an acceptable solution for circular and cylindrical cells where uniform radial forces exist. However, preventing electrolyte leakage from prismatic (rectangular) cells is much more difficult. Conventional crimping techniques and cell designs are usually unsuccessful in controlling KOH leakage because of the non-uniform distribution of forces operating along the cell's perimeter. Even the use of rounded corners, fails to produce a leak-proof cell due to the changing compressive forces between the rounded corners and the straight side-walls.

In order to solve this problem, according to the present invention, there is now provided a metal-air electrochemical cell, having a leak-proof, metal prismatic casing comprising a pair of interfacing interengaging rectangular tray-like casing components, a first substantially rectangular tray-like casing component having a first major surface and contiguous side walls for encompassing a cathode of said cell and a second inverted substantially tray-like casing component having a second major surface and contiguous depending side walls for encompassing an anode of said cell, the side walls of one of said casing components being of a height to facilitate the curling and crimping of an upper portion thereof over a peripheral edge area of the major surface of the other casing component to form a leak-proof, closed prismatic casing.

As will be realized, in contradistinction to the prior art button-like metal-air cells, the interaction of forces between said upper portion of the side walls of said one casing component and the peripheral edge area of the major surface of the other casing component, upon curling and crimping to form a closed casing, are axial.

In preferred embodiments of the present invention there is provided a prismatic metal-air electrochemical cell, having a leak-proof, metal prismatic casing comprising a pair of interfacing interengaging rectangular tray-like casing components, a first substantially rectangular tray-like casing component having a first major surface and contiguous side walls for encompassing a cathode of said cell and a second inverted substantially tray-like casing component having a second major surface and contiguous depending side walls for encompassing an anode of said cell, the side walls of one of said casing components being of a height to facilitate the curling and crimping of an upper portion thereof over a peripheral edge area of the major surface of the other casing component to form a leak-proof, closed prismatic casing.

In especially preferred embodiments of the present invention there is provided a metal-air electrochemical cell, having a leak-proof, metal prismatic casing comprising a pair of interfacing interengaging rectangular tray-like casing components, a first substantially rectangular tray-like casing component having a first major surface and contiguous side walls for encompassing a cathode of said cell and a second inverted substantially tray-like casing component having a second major surface and contiguous depending side walls for encompassing an anode of said cell, wherein one of said major surfaces is provided with a groove adjacent a peripheral edge thereof forming a peripheral rim therewith, the side walls of the other casing component being of a height to facilitate the curling and crimping of an upper portion thereof over the surface of said rim and toward and into said peripheral groove upon assembly of said components to form a closed casing.

In the most preferred embodiments of the present invention there is provided a metal-air electrochemical cell, having a leak-proof, metal prismatic casing comprising a pair of interfacing interengaging rectangular tray-like casing components, a first substantially rectangular tray-like casing component having a first major surface and contiguous side walls for encompassing a cathode of said cell and a second inverted substantially tray-like casing component having a second major surface and contiguous depending side walls for encompassing an anode of said cell, wherein said second major surface is provided with a groove adjacent said depending side walls forming a peripheral rim therewith, the side walls of said first casing component being of a height to facilitate the curling and crimping of an upper portion thereof over the surface of said rim and toward and into said peripheral groove upon assembly of said components to form a closed casing.

In order to increase the interaction of forces between the interengaging casing components and in order to allow for applied axial forces to operate over a greater surface area there is provided according to the present invention a metal-air electrochemical cell, having a leak-proof, metal prismatic casing comprising a pair of interfacing interengaging rectangular tray-like casing components, a first substantially rectangular tray-like casing component having a first major surface and contiguous side walls for encompassing a cathode of said cell and a second inverted substantially tray-like casing component having a second major surface and contiguous depending side walls for encompassing an anode of said cell, wherein said depending side walls are provided with a terminal outwardly extending peripheral flange, and said second major surface is provided with a groove adjacent said depending side walls forming a peripheral rim therewith, the side walls of said first casing component being of a height to facilitate the curling and crimping of an upper portion thereof over the surface of said rim and toward and into said peripheral groove upon assembly of said components to form a closed casing.

Preferably said flange is bent at an angle of about 90° from the plane of the depending side wall from which it extends In U.S. Pat. No. 5,537,733 there is described a method of manufacture of a rectangular nickel-metal hydride secondary cell and in U.S. Pat. No. 5,556,722 there is described a prismatic casing for a lithium ion-type cell. However, neither of said patents teaches or suggests the configuration of the present casing and the solution of the problem of preventing leaks in a zinc air-type cell, as taught for the first time herein.

Similarly, U.S. Pat. Nos. 4,374,909; 4,656,104 5,432,027; and 5,662,717 all relate to casings for metal-air button-type batteries, as discussed above. However none teaches a solution for achieving a leak-proof seal in a prismatic metallic casing.

The casings and metal-air electrochemical cells of the present invention are especially suitable for use in battery packs for powering cellular telephones. In typical state-of-the-art duty profiles on discharge in analog mode, the pack must provide for about 500-mA continuous current, depending on location. An alternative digital mode cellular system (GSM) used by Motorola requires a repeating cycle of about 78 mA for 4 milliseconds followed by a pulse of 1,340 mA for 0.5 milliseconds. The digital mode profile used by Ericsson is different from that used by Motorola, requiring a repeating cycle of about 150 mA for 4 milliseconds followed by a pulse of 2,000 mA for 0.5 milliseconds.

The casings of the present invention enable the preparation of cell packs for cellular telephones comprised of primary, low-cost, disposable, prismatic zinc-air cells, each cell having a capacity typically in the range of 2–5 Ah. this amp-hour figure represents a significant capacity advantage—at least a factor of three—over the rival high-cost, but rechargeable, lithium-ion and nickel-metal hydride cell assemblies currently being used with cellular phones.

Thus, in a comparison between performance of a battery pack for cellular phones comprising prismatic zinc-air cells according to the present invention, as compared with cells presently available on the market, the following are approximate typical figures.

| Battery | Type | Talk | Standby | Improvement Factor** |
|---|---|---|---|---|
| EFL Prototype | Zn-air | 338 min | 58 hrs | — |
| Slim extra Capacity | Li-ion | 95 min | 14 hrs | 3.55× |
| Slim extra Capacity | NiMeH | 100 min | 16 hrs | 3.40× |
| Slim extra Capacity | NiCd | 70 min | 12 hrs | 4.80× |

**The number of times Zn-air "talk time" exceeds that of the competing battery

In preferred embodiments of the present invention said second major surface is downwardly stepped in the direction of its periphery.

In further preferred embodiments of the present invention said side walls of said first major surface extend therefrom at an angle of about 90° and then diverge at an obtuse angle relative to the plane of said surface.

In another family of embodiments of the present invention said side walls of said first major surface extend therefrom at an obtuse angle relative to the plane of said surface.

In different embodiments of the present invention said first major surface is provided with a downwardly extending peripheral groove bounded by said four side walls.

Also provided in the casing of the present invention is a plastic grommet, positioned between said contiguous side walls and said contiguous depending side walls and having an upper portion curled over the surface of said rim and toward and into said peripheral groove upon assembly of said components to form a closed casing.

The present invention also provides a leak-proof, metal prismatic casing for a metal-air electrochemical cell, as hereinbefore defined, in combination with an air cathode, said air cathode being dimensioned to be slightly larger than the internal dimensions of said first tray-like casing component.

While in preferred embodiments of the present invention said flange is bent at an angle of about 90°, in other embodiments of the present invention said flange is further bent at an additional angle of up to about 90° to form a composite angle of up to about 180°.

The effect of the above bent flanges is to increase the moment of inertia of the anode can, preventing the prismatic (rectangular) casing from deformation and partial collapse during crimping.

Preferably said depending side walls descend at an obtuse angle from said major surface, e.g. at an angle of about 91° to 100° from said major surface.

It has now been found that extending the height of the side walls of the cathode can at the top of the cathode casing changes the direction of the sealing forces from radial to axial, thereby creating a more uniform force distribution regardless of the shape of the cell; controls the pressure on the seal more effectively, once the casing has been closed; and the sharp radius of crimp increases grommet compression between the anode and cathode cans, producing a tighter, stronger, leak-resistant seal which more effectively controls KOH "creep".

In preferred embodiments of the present invention, bending the bottom of the anode can by 90° produces a larger cross sectional seal footprint, making for improved cathode to can and anode to grommet seals, reduces the chances of exposing nickel to the KOH electrolyte when a nickel clad metal, such as Tri-clad, is used for the anode casing, produces a better surface quality at the anode sealing site and affords better control of the anode height.

In contradistinction, when a machining procedure is used to trim the bottom of the anode can, underlying nickel can be exposed to the zinc anode and basic electrolyte leading to an undesirable chemical reaction wherein nickel participates in a galvanic reaction with zinc and electrolyte producing hydrogen gas. With the inclusion of a pre-formed bend, nickel exposure is less likely;

Furthermore, it is known that metallic scratches act as channels through which KOH flows. A molded bend obviates the need for cutting and/or other machining processes which can destroy the anode can's smooth finish.

Without the bend, the anode casing usually requires cutting, a procedure reducing manufacturing reproducibility. Forming the anode casing with a predefined bend allows for the production of anode cans with repeatable dimensions.

As stated, in preferred embodiments of the present invention the cathode can is flared slightly outward in its pre-closed state. This facilitates manufacturing of the part and placement of the anode can and grommet in the cathode casing prior to final assembly.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF PREFERRED EXEMPLARY EMBODIMENTS

Figure 1:
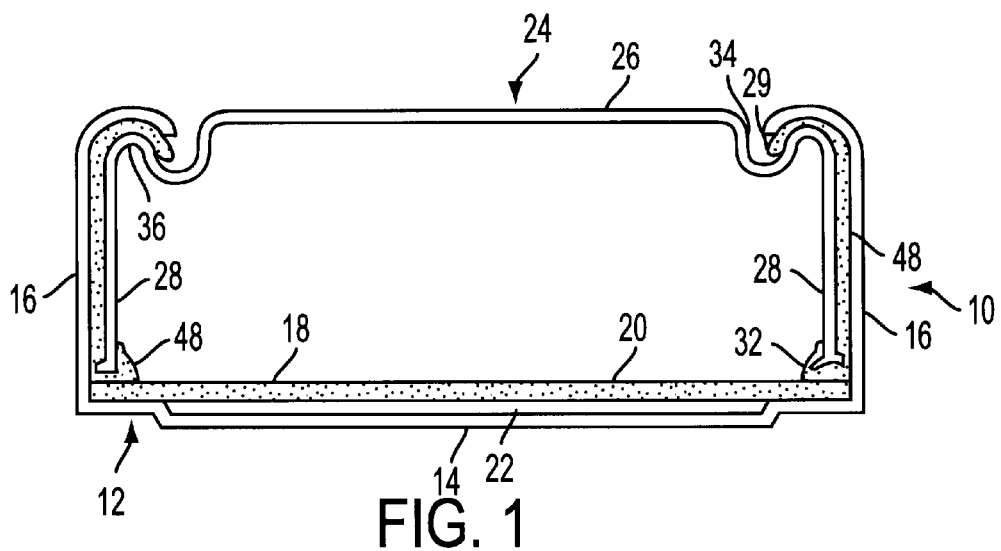
FIG. 1 is a sectional elevation of a closed cell, according to the invention.

There is seen in FIG. 1 a leak-proof metal prismatic casing 10 of a metal (zinc)-air electrochemical cell. The shown cell casing in the present embodiment is rectangular but has rounded corners, and is sized to serve as a disposable battery for a cellular phone.

A first substantially rectangular tray-like casing component 12 has a first major surface 14. Connected thereto are four contiguous side walls 16 which encompass the cell cathode 18, this comprising an air cathode sandwiched between an upper separator 20 and an optional lower diffusion pad 22.

A second, inverted tray-like casing component 24 has a second major surface 26 and also four contiguous depending side walls 28. These encompass the gelled zinc anode (not shown). The walls 28 have a terminal outwardly extending peripheral flange 32 seen to better advantage in FIG. 3.

The second major surface 26 is provided with a groove 34 adjacent to the depending side walls 28, and forms a peripheral rim 36 therewith.

The side walls 16 of the first casing component 12 are made sufficiently high to allow curling and crimping thereof over the surface of said rim 36 and toward and into the peripheral groove 34. Curling and crimping is effected after all the cell components are in place and form a closed leak-proof casing.

A plastic grommet 48, made of an elastomer resistant to the KOH electrolyte, is positioned between the side walls 16 and 28. An upper lip 29 of the grommet 48 is curled at assembly over the surface of said rim 36 and toward and into the peripheral groove 34.

With reference to the rest of the figures, similar reference numbers are used to identify similar parts.

Figure 2:
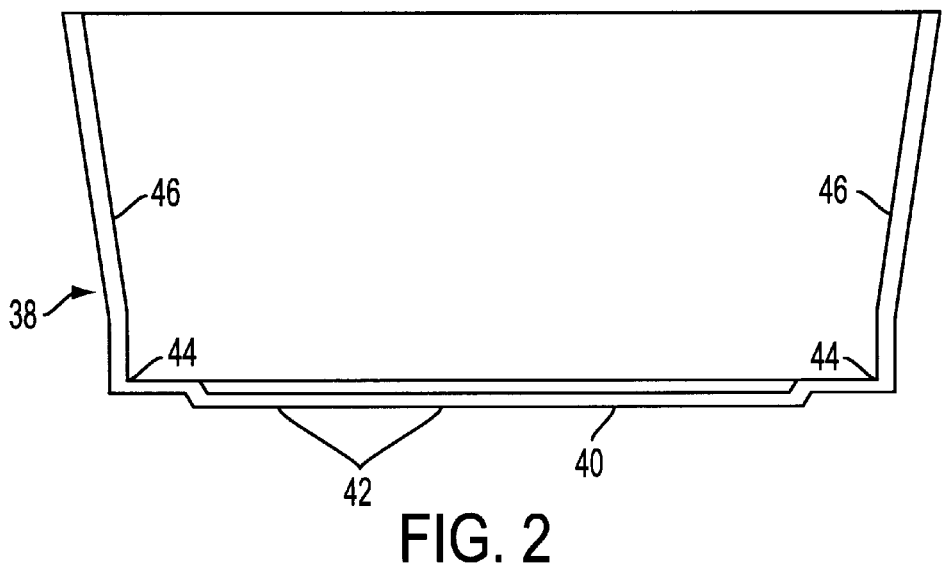
FIG. 2 is a sectional elevational view of a cathode can, provided with vent holes, before assembly.

Referring now to FIG. 2, there is seen a first substantially rectangular tray-like casing component 38 as it appears before assembly. The first major surface 40 is provided with a multitude of small air access holes 42. Air entering holes 42 provides the oxygen needed for operation of the air cathode 18 seen in FIG. 1, and thus of the cell.

The casing component 38 is seen in its pre-assembled state as having outwardly flared walls 46, which facilitate the insertion therein of second component 24 and of a grommet 48 seen in FIG. 1.

FIG. 2 shows the flare beginning at a distance from the corner while, alternatively, the flare can begin at the corner itself (not shown).

Figure 3:
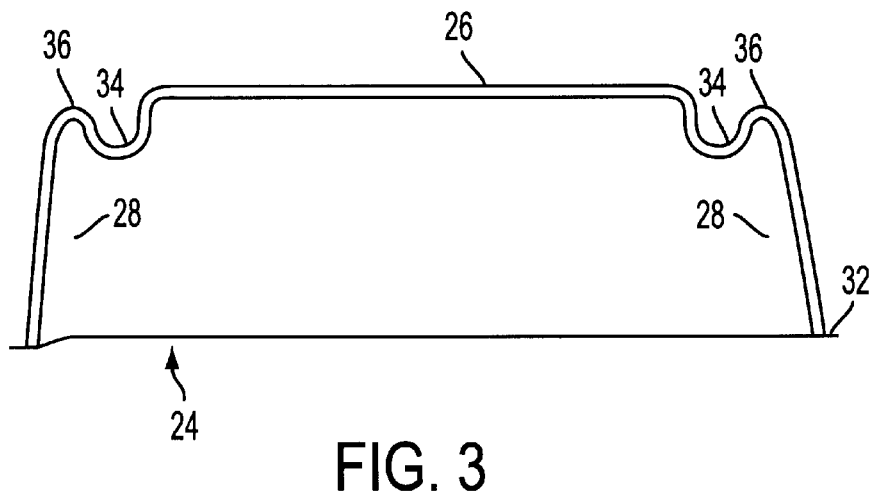
FIG. 3 is a sectioned elevational view of an anode housing before assembly.

FIG. 3 illustrates the second, inverted tray-like casing component 24 as it appears before assembly in the cell shown in FIG. 1. The peripheral rim 36 has a width of at least the thickness of the wall of the anode can. The actual rim thickness is controlled by the slope of the external edge of the peripheral groove or equivalently the internal side of the rim and preferably has a width of at least about 0.5 mm.

The depending side walls 28 of the upper second casing component 24 descend at an obtuse angle, preferably between 91 and 100 degrees, relative to the second major surface 26.

Figure 4:
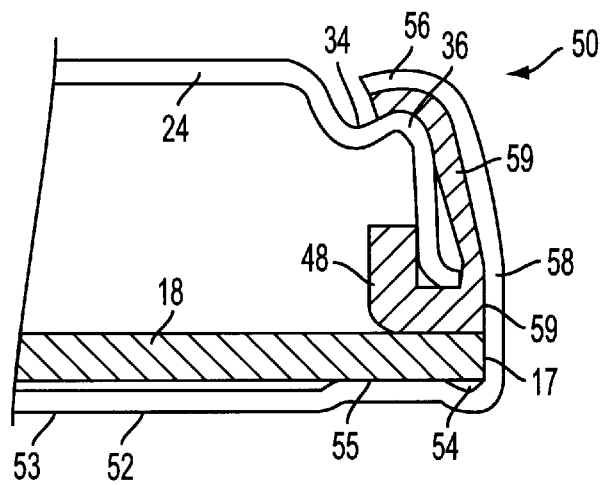
FIG. 4 is a sectioned detail of a cell having a peripheral groove.

The obtuse angle stabilizes the casing 24 during curling and crimping by preventing collapse of the cell when the necessary axial forces are applied. Particularly, the inner depending side walls 28 are prevented from buckling inwards during cell case final assembly, as seen in FIG. 4. The increased resistance of the casing 24 to collapse allows the application of increased axial forces during crimping to give a tighter seal against the grommet 48 shown in FIG. 1.

Seen in FIG. 4 is a detail of a further cell casing 50. The first major surface 52 of casing component 53 is provided with a downward extending peripheral groove 54 bounded by the four side walls 58.

Groove 54 obviates the need for a very sharply bent corner, as seen in FIG. 2 at 44, which is difficult to manufacture and undesirably reduces wall thickness at the corner. The groove 54 allows areas of inner side surfaces of sides 58, after the curling and crimping of the upper portions 56 of sides 58 of the cell component 53 over the surface of rim 36 and into the peripheral groove 34, to maintain maximum contact with at least major portions of edge surfaces 17 of the air cathode 18 maximizing the electrical contact between the cathode 18 and the cathode cell casing 53. The air electrode is preferably oriented with said edge surfaces 17 parallel to and with major portions thereof abutting inner surfaces of the walls of the cathode casing to maximize electrical contact.

Groove 54 also serves as a catch reservoir for excessive sealant which is applied at points 55 and 59 among others, the latter being the inside of cathode can 53 adjacent to grommet 48. Inter alia said catch reservoir limits leakage of excess sealant and blockage thereby of the diffuser (not shown). The air cathode 18 is preferably slightly larger than the internal dimensions of the first tray-like casing component 53, and is inserted before the curling over of the assembly shown in the figure.

Furthermore, as can be seen in said Fig., the interaction of forces between said upper portions 56 of sides 58 of the cell casing component 53 and rim 36 and peripheral groove 34 of casing component 24 are substantially axial rather than the radial forces common to button cells.

Figure 5:
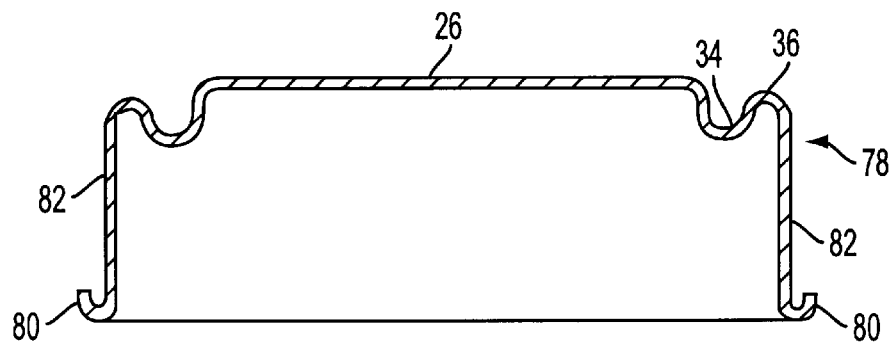
FIG. 5 is an elevational cross-section of an upper casing component provided with a 180 degree flange.

FIG. 5 shows an embodiment of the upper casing component 78 having additional protection against creep of the fluid electrolyte. The flange 80 at the lower extremity of the dependent walls 82 is bent at an additional angle of up to about 90 degrees to form a composite angle of up to about 180 degrees. Increasing the contact area between the side wall flange 80 and the grommet 48 shown in FIG. 1 provides further protection against electrolyte creep. The double bend also reduces the possibility of nickel from the edge of the anode can being exposed to the chemical components of the cell. As has been explained, such nickel exposure could cause an undesirable chemical reaction leading to the generation of unwanted hydrogen.

Figure 6:
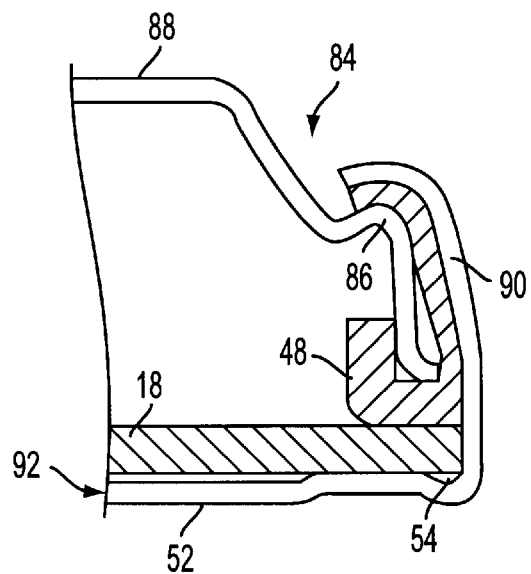
FIG. 6 is a sectioned detail of a casing having a rim lower than the upper surface.

FIG. 6 illustrates a further embodiment of the cell casing 84. The casing 84 is similar to casing 50 shown in FIG. 4, except that the rim 86 is well below the top surface 88, thus making possible the use of lower side walls 90 in the first casing component 92. The outer walls 90, after being curled and crimped to form a closed casing, project upwards at an acute angle to the first major surface 52.

As illustrated in FIGS. 4 and 6, the present invention permits production of cells with various different electrical capacities merely by altering the stamping of the anode while using the same crimping tools and production line.

Figure 7:
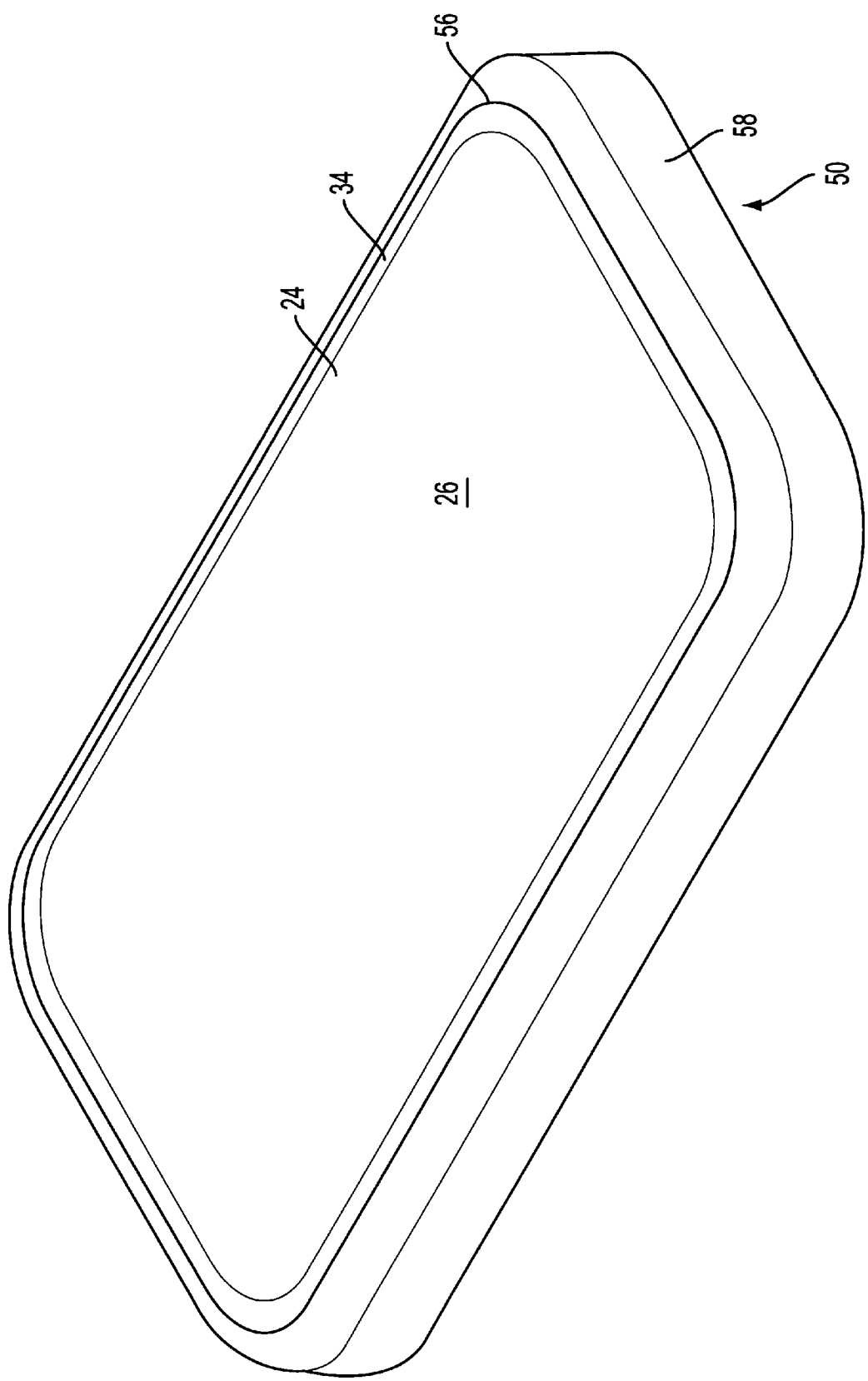
FIG. 7 is a top perspective view of a prismatic metal-air electrochemical cell according to the present invention.

Referring now to FIG. 7, there is seen a top perspective view of the prismatic metal-air electrochemical cell shown in partial cross-section in FIG. 4. Shown is tray-like casing component 50, having side walls 58, the upper portions 56 of which side walls are curled and crimped into peripheral groove 34 of surface 26 of casing component 24.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A metal-air electrochemical cell, having a leak-proof, metal prismatic casing comprising a pair of interfacing interengaging rectangular tray casing components, a first substantially rectangular tray casing component having a first major surface and contiguous side walls for encompassing a cathode of said cell and a second inverted substantially tray casing component having a second major surface and contiguous depending side walls for encompassing an anode of said cell, the side walls of one of said casing components being of a height to facilitate the curling and crimping of an upper portion thereof over a peripheral edge area of the major surface of the other casing component to form a leak-proof, closed prismatic casing.

2. A metal-air electrochemical cell, having a leak-proof, metal prismatic casing according to claim 1, wherein the interaction of forces between said upper portion of the side walls of said one casing component and the peripheral edge area of the major surface of the other casing component, upon curling and crimping to form a closed casing, are axial.

3. A metal-air electrochemical cell, having a leak-proof, metal prismatic casing comprising a pair of interfacing interengaging rectangular tray casing components, a first substantially rectangular tray casing component having a first major surface and contiguous side walls for encompassing a cathode of said cell and a second inverted substantially tray casing component having a second major surface and contiguous depending side walls for encompassing an anode of said cell, wherein one of said major surfaces is provided with a groove adjacent a peripheral edge thereof forming a peripheral rim therewith, the side walls of the other casing component being of a height to facilitate the curling and crimping of an upper portion thereof over the surface of said rim and toward and into said peripheral groove upon assembly of said components to form a closed casing.

4. A metal-air electrochemical cell, having a leak-proof, metal prismatic casing comprising a pair of interfacing interengaging rectangular tray casing components, a first substantially rectangular tray casing component having a first major surface and contiguous side walls for encompassing a cathode of said cell and a second inverted substantially tray casing component having a second major surface and contiguous depending side walls for encompassing an anode of said cell, wherein said second major surface is provided with a groove adjacent said depending side walls forming a peripheral rim therewith, the side walls of said first casing component being of a height to facilitate the curling and crimping of an upper portion thereof over the surface of said rim and toward and into said peripheral groove upon assembly of said components to form a closed casing.

5. A metal-air electrochemical cell, having a leak-proof, metal prismatic casing comprising a pair of interfacing interengaging rectangular tray casing components, a first substantially rectangular tray casing component having a first major surface and contiguous side walls for encompassing a cathode of said cell and a second inverted substantially tray casing component having a second major surface and contiguous depending side walls for encompassing an anode of said cell, wherein said depending side walls are provided with a terminal outwardly extending peripheral flange, and said second major surface is provided with a groove adjacent said depending side walls forming a peripheral rim therewith, the side walls of said first casing component being of a height to facilitate the curling and crimping of an upper portion thereof over the surface of said rim and toward and into said peripheral groove upon assembly of said components to form a closed casing.

6. A metal-air electrochemical cell, having a leak-proof, metal prismatic casing according to claim 5, said flange being bent at an angle of about 90° from the plane of the depending side wall from which it extends.

7. A metal-air electrochemical cell, having a leak-proof, metal prismatic casing according to claim 5, wherein said second major surface is downwardly stepped in the direction of its periphery.

8. A metal-air electrochemical cell, having a leak-proof, metal prismatic casing according to claim 5, wherein said side walls of said first major surface extend therefrom at an angle of about 90° and then diverge at an obtuse angle relative to the plane of said surface.

9. A metal-air electrochemical cell, having a leak-proof, metal prismatic casing according to claim 8, wherein said obtuse angle is between about 91 and 100°.

10. A metal-air electrochemical cell, having a leak-proof, metal prismatic casing according to claim 5, wherein said side walls of said first major surface extend therefrom at an obtuse angle relative to the plane of said surface.

11. A metal-air electrochemical cell, having a leak-proof, metal prismatic casing according to claim 5, wherein said first major surface is provided with air access holes.

12. A metal-air electrochemical cell, having a leak-proof, metal prismatic casing according to claim 5, wherein said first major surface is provided with a downwardly extending peripheral groove bounded by said side walls.

13. A metal-air electrochemical cell, having a leak-proof, metal prismatic casing according to claim 5, in combination with an air cathode, said air cathode being dimensioned to be slightly larger than the internal dimensions of said first tray-like casing component.

14. A metal-air electrochemical cell, having a leak-proof, metal prismatic casing according to claim 5, in combination with an air cathode, said air cathode being substantially prismatic in shape, having two major surfaces and four side surfaces, wherein upon curling and crimping of an upper portion of the side walls of said first casing component to form a closed casing, major portions of at least two side surfaces of said air cathode are in abutting relationship with adjacent inner surfaces of side walls of said first tray casing component.

15. A metal-air electrochemical cell, having a leak-proof, metal prismatic casing according to claim 5, wherein said rim has a width of at least the thickness of a side wall of said second tray casing component.

16. A metal-air electrochemical cell, having a leak-proof, metal prismatic casing according to claim 5, wherein said rim has a width of at least about 0.5 mm.

17. A metal-air electrochemical cell, having a leak-proof, metal prismatic casing according to claim 5, wherein said flange is bent to form a composite angle of up to about 180°.

18. A metal-air electrochemical cell, having a leak-proof, metal prismatic casing according to claim 5, wherein said depending side walls descend at an obtuse angle from said major surface.

19. A metal-air electrochemical cell, having a leak-proof, metal prismatic casing according to claim 18, wherein said depending side walls descend at an angle of about 91° to 100° from said major surface.

20. A metal-air electrochemical cell, having a leak-proof, metal prismatic casing according to claim 5, further comprising a plastic grommet, positioned between said contiguous side walls and said contiguous depending side walls and having an upper portion curled over the surface of said rim and toward and into said peripheral groove upon assembly of said components to form a closed casing.

21. A metal-air electrochemical cell, having a leak-proof, metal prismatic casing according to claim 5, wherein the interaction of forces between said upper portion of the side walls of said first casing component and the rim and peripheral groove of said second casing component, upon curling and crimping to form a closed casing, are substantially axial.

* * * * *